United States Patent
Naumann

(10) Patent No.: US 8,881,769 B2
(45) Date of Patent: Nov. 11, 2014

(54) STRUCTURE OF A GAS-VALVE UNIT

(75) Inventor: Jörn Naumann, Durbach (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 26 days.

(21) Appl. No.: 13/820,167

(22) PCT Filed: Sep. 12, 2011

(86) PCT No.: PCT/EP2011/065734
§ 371 (c)(1),
(2), (4) Date: Mar. 1, 2013

(87) PCT Pub. No.: WO2012/038287
PCT Pub. Date: Mar. 29, 2012

(65) Prior Publication Data
US 2013/0153065 A1  Jun. 20, 2013

(30) Foreign Application Priority Data
Sep. 20, 2010 (EP) .................................. 10290501

(51) Int. Cl.
F16K 11/18 (2006.01)
F16K 31/08 (2006.01)
F23N 1/00 (2006.01)
F16K 27/02 (2006.01)

(52) U.S. Cl.
CPC .............. *F23N 1/007* (2013.01); *F16K 31/088* (2013.01); *F23N 2035/22* (2013.01); *F23N 2035/24* (2013.01); *F23N 2041/08* (2013.01); *F23N 2035/18* (2013.01); *F23N 2035/16* (2013.01); *F16K 31/084* (2013.01); *F16K 27/029* (2013.01)

USPC .............. 137/636.3; 137/601.01; 137/601.16; 137/627.5; 251/65; 126/52

(58) Field of Classification Search
USPC ............. 137/599.01, 601.01, 601.15, 601.16, 137/627.5, 636, 636.3; 251/65; 126/52; 431/12, 280
See application file for complete search history.

(56) References Cited

U.S. PATENT DOCUMENTS 4,456,032 A * 6/1984 Straslicka ................. 137/630.19
4,582,084 A * 4/1986 Gyurovits ................... 137/493.8
(Continued)

FOREIGN PATENT DOCUMENTS

DE 10249938 A1 5/2004
JP 53012528 A 2/1978
(Continued)

OTHER PUBLICATIONS

International Search Report PCT/EP2011/065734 Dated Jan. 26, 2012.

*Primary Examiner* — Eric Keasel
*Assistant Examiner* — Reinaldo Sanchez-Medina
(74) *Attorney, Agent, or Firm* — James E. Howard; Andre Pallapies

(57) ABSTRACT

A gas valve unit for adjusting a volumetric gas flow which is fed to a gas burner of a gas device includes a valve chamber, an actuation shaft protruding out of the valve chamber, and at least two on/off valves arranged in the valve chamber. Further arranged in the valve chamber is at least one restrictor plate having at least two restrictor points, each of the restrictor points having at least one restrictor opening. The restrictor plate is accessible from a side of the valve chamber on which the actuation shaft is protruding from the valve chamber.

21 Claims, 4 Drawing Sheets

(56) References Cited

U.S. PATENT DOCUMENTS

| | | | |
|---|---|---|---|
| 4,785,848 A | 11/1988 | Leiber | |
| 4,909,277 A * | 3/1990 | Vandiver | 137/493.7 |
| 5,920,131 A * | 7/1999 | Platt et al. | 307/104 |
| 7,513,247 B2 * | 4/2009 | Clauss et al. | 126/39 E |
| 8,020,586 B2 * | 9/2011 | Delamarche | 137/831 |
| 8,440,945 B2 * | 5/2013 | Blumenthal et al. | 219/625 |
| 2006/0057520 A1 * | 3/2006 | Saia et al. | 431/281 |
| 2011/0155931 A1 * | 6/2011 | Weiss | 251/65 |
| 2012/0111434 A1 | 5/2012 | Cadeau et al. | |
| 2012/0118280 A1 | 5/2012 | Cadeau et al. | |
| 2012/0132836 A1 | 5/2012 | Cadeau et al. | |

FOREIGN PATENT DOCUMENTS

| | | |
|---|---|---|
| JP | 58142457 U | 9/1983 |
| JP | H02150471 U | 12/1990 |

* cited by examiner

STRUCTURE OF A GAS-VALVE UNIT

BACKGROUND OF THE INVENTION

The invention relates to a gas valve unit for adjusting a volumetric gas flow which is fed to a gas burner of a gas device, in particular a gas cooking device, wherein the gas valve unit has a valve chamber and an actuation shaft which protrudes out of the valve chamber, in which valve chamber are designed at least two on/off valves of the gas valve unit, and in which valve chamber are designed at least two restrictor points each having at least one restrictor opening.

Gas valve units of the aforementioned type are described in the subsequently published patent applications PCT/EP2010/060173, PCT/EP2010/060176 and PCT/EP2010/060179. When the gas valve units are used in gas cooking devices, the gas valve units are operated—depending on the configuration of the gas cooking device, on the type of gas supply available at the installation location and on country-specific standards—in combination with different gas burners and with different gas types, such as natural gas, liquid petroleum gas or town gas, and also with different gas pressures. For each combination of gas burner, gas type and gas pressure which occurs in practice the cross-sections of the restrictor openings of the gas valve unit must be adjusted individually in order that the gas burner burns with the desired output in each switching stage of the gas valve unit.

BRIEF SUMMARY OF THE INVENTION

The object of the present invention therefore is to make available a gas valve unit for which an adjustment of the opening cross-sections of the restrictor openings is enabled in a simple manner.

This object is achieved according to the invention in that the valve chamber has at least one restrictor plate in which the restrictor openings of the restrictor points are arranged and the restrictor plate is accessible from the side of the valve chamber on which the actuation shaft is protruding from the valve chamber. External access to the restrictor plate is thereby possible. Access to the restrictor plate is gained in this situation from the side of the valve chamber on which the actuation shaft is also arranged. If the gas valve unit is built into a gas hob, this is as a rule the upper side of the gas hob. In order to be able to access the restrictor plate the cover plate—also referred to as the top sheet—must then be removed from the gas hob. The actuation shaft is question is preferably a rotatable shaft. In this situation, the gas valve unit is actuated by rotating the actuation shaft. It is also possible to arrange the actuation shaft not in rotatable fashion but in linearly movable fashion. In this case the actuation of the gas valve unit takes place through movement of the actuation shaft in a direction perpendicular to the shaft axis.

Particularly advantageously, the restrictor plate is replaceable. In this situation the restrictor plate can be removed completely from the valve chamber of the gas valve unit and be replaced by another restrictor plate. This is for example necessary when a gas cooking zone is converted to a different gas type.

Expediently, on the side of the valve chamber on which the actuation shaft is protruding from the valve chamber the valve chamber has a covering and the restrictor plate is accessible by removing the covering. The covering closes off the valve chamber to the side on which the actuation shaft is arranged. The covering must be removed in order to be able to access the restrictor plate.

According to an advantageous embodiment of the invention, the valve chamber has a plurality of plates arranged parallel to one another, wherein one of the plates is formed by the restrictor plate. The plates have recesses or openings through which gas flows or does not flow, depending on which of the on/off valves is open.

In this case, one of the plates is formed by a valve sealing plate which forms the valve seats of the on/off valves, wherein the valve sealing plate is preferably made from a flexible material, from plastic for example. In the region of each valve seat the valve sealing plate has an opening through which gas flows when the on/off valve is open. If the on/off valve is closed, a valve chamber of the on/off valve sits on the valve sealing plate and closes the associated opening.

The valve sealing plate thus has an opening in the region of each valve, which when the on/off valve is closed by means of a shut-off body of the on/off valve sitting on the valve sealing plate.

Particularly advantageously, the on/off valves can be actuated by means of a permanent magnet, in particular the shut-off bodies of the on/off valves can be moved by means of the force of at least one permanent magnet. The shut-off bodies are attracted by the magnetic force of the permanent magnet when the latter is situated directly above the shut-off body. If the permanent magnet is situated at a different position, the shut-off body is pushed against the direction of the magnetic force, for example by means of the force of a spring, onto the valve sealing plate.

The following alternatives to the preferred embodiment described above, wherein a permanent magnet is moved relative to the ferromagnetic shut-off bodies of the on/off valves, are possible:

- Instead of a single permanent magnet, a plurality of permanent magnets is provided for actuation of the on/off valves;
- the shut-off bodies of the on/off valves are embodied as permanent magnets or are each permanently connected to a permanent magnet while a non-magnetized actuation element made from ferromagnetic material is moved relative to the shut-off bodies;
- the shut-off bodies of the /off valves are moved not by means of magnetic force but mechanically.

The permanent magnet in this case is arranged on the side of the on/off valves facing away from the plates.

According to an embodiment design of the invention, the permanent magnet is spaced away from the actuation shaft in the radial direction and coupled to the actuation shaft in such a manner that a rotation of the actuation shaft causes a movement of the permanent magnet relative to the on/off valves. To this end, for example a handle can be fitted directly onto the actuation shaft. It is also possible for example to have an electrical final control element act on the actuation shaft.

A pressure plate made from substantially rigid material, for example metal, is arranged on the side of the valve sealing plate facing away from the shut-off bodies. The pressure plate prevents an unwanted deformation of the valve sealing plate and absorbs the compressive force exerted on the valve sealing plate by the valve chambers.

In this case the pressure plate has openings corresponding to the openings in the valve sealing plate. Between the pressure plate and the restrictor plate is arranged a first gas distribution plate which has openings corresponding to the openings in the pressure plate and to the restrictor openings in the restrictor plate. The openings in the gas distribution plate serve to connect two restrictor openings to each other in each case. Furthermore, the openings in the pressure plate lead in each case into an opening in the first gas distribution plate.

On the side of the restrictor plate facing away from the first gas distribution plate is arranged a second gas distribution plate which has openings corresponding to the restrictor openings in the restrictor plate. The second gas distribution plate likewise serves to connect to each other two restrictor openings of the restrictor plate arranged next to each other. In this case, the second gas distribution plate in each case connects two adjacent restrictor openings which are not connected by means of the first gas distribution plate.

The second gas distribution plate and the covering form a preferably separable structural unit. The second gas distribution plate and the covering can be removed as a structural unit for replacement of the restrictor plate. This minimizes the number of individual components to be disassembled. Separation of the second gas distribution plate from the covering is possible, but not required.

Equally advantageously, the valve sealing plate and the pressure plate and the first gas distribution plate form a non-separable structural unit. The stated plates can for example be bonded together or vulcanized on top of one another.

BRIEF DESCRIPTION OF THE DRAWINGS

Further advantages and details of the invention will be described in greater detail with reference to the exemplary embodiments illustrated in the schematic figures. In the drawings.

DETAILED DESCRIPTION OF EXEMPLARY EMBODIMENTS OF THE PRESENT INVENTION

Figure 1:
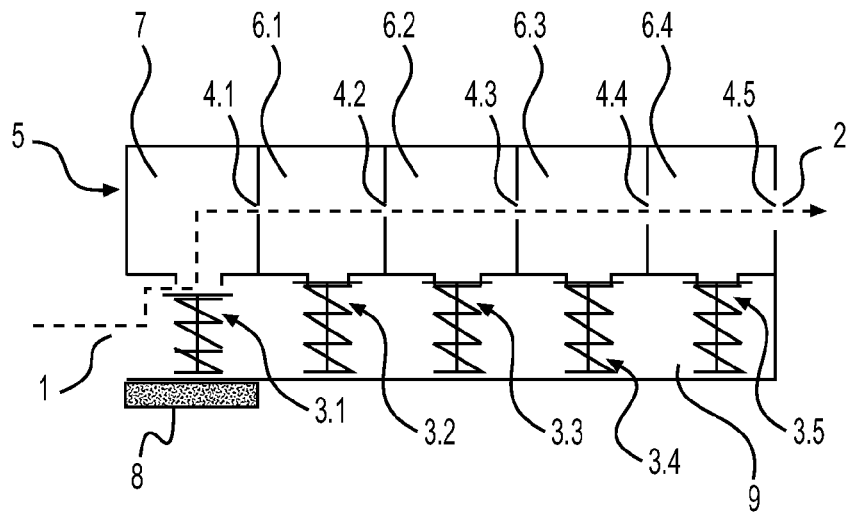
FIG. 1 shows a schematic switching arrangement of the gas valve unit with a first on/off valve open.

FIG. 1 shows the switching arrangement of the gas valve unit according to the invention. The figure depicts a gas inlet 1, by means of which the gas valve unit is connected for example to a main gas line of a gas cooking device. The gas provided for burning is present at the gas inlet 1 at a constant pressure of, for example, 20 millibars or 50 millibars. A gas line leading for example to a gas burner of the gas cooking device is connected to a gas outlet 2 of the gas valve unit. The gas inlet 1 is connected by way of a gas inlet chamber 9 of the gas valve unit to the inlet side of the five on/off valves 3 (3.1 to 3.5) in the present exemplary embodiment. Opening the on/off valves 3 causes the gas inlet 1 to be connected in each case to a specific section of a restrictor segment 5 into which the gas flows by way of the opened on/off valve 3. The restrictor segment 5 includes an inlet section 7 into which the first on/off valve 3.1 leads. The further on/off valves 3.2 to 3.5 each lead into a respective connecting section 6 (6.1 to 6.4) of the restrictor segment 5. The transition between the inlet section 7 and the first connecting section 6.1, and also the transitions between two adjacent sections of the connecting sections 6.1 to 6.4 is formed in each case by a restrictor point 4 (4.1 to 4.5). The last restrictor point 4.5 connects the last connecting section 6.4 to the gas outlet 2. The restrictor points 4.1 to 4.5 possess a sequentially increasing opening cross-section. The through-flow cross-section of the last restrictor point 4.5 can be chosen sufficiently large that the last restrictor point 4.5 has practically no restriction function.

The on/off valves 3 are actuated by means of a permanent magnet 8 which is movable along the row of on/off valves 3. In this arrangement the force for opening the respective on/off valve 3 is created directly by the magnetic force of the permanent magnet 8. Said magnetic force opens the respective on/off valve 3 against a spring force.

Only the first on/off valve 3.1 is open in the switching position according to FIG. 1. The gas flows from the gas inlet chamber 9 through said on/off valve 3.1 into the inlet section 7 and from there passes all restrictor points 4 and all connecting sections 6 on the way to the gas outlet 2. The volume of gas flowing through the valve unit dictates the minimum performance of the gas burner connected to the gas valve unit.

Figure 2:
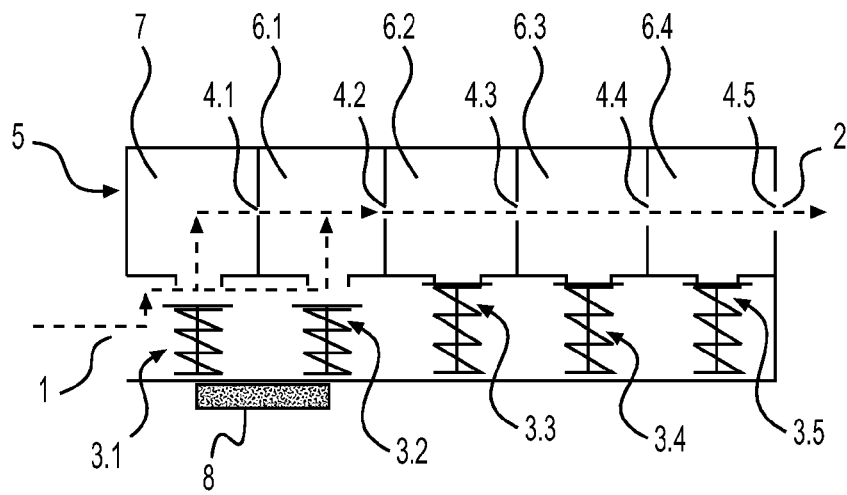
FIG. 2 shows the schematic switching arrangement with two on/off valves open.

FIG. 2 shows the schematic switching arrangement in which the permanent magnet 8 is shifted to the right in the drawing such that both the first on/off valve 3.1 and also the second on/off valve 3.2 are open.

The gas flows from the gas inlet chamber 9 through the open second on/off valve 3.2 directly into the first connecting section 6.1 and from there by way of the restrictor points 4.2 to 4.5 to the gas outlet 2. Because the on/off valve 3.2 is open the gas flowing to the gas outlet 2 bypasses the first restrictor point 4.1. The volumetric gas flow in the switching position according to FIG. 2 is therefore greater than the volumetric gas flow in the switching position according to FIG. 1. The gas inflow into the first connecting section 6.1 takes place practically exclusively by way of the second on/off valve 3.2. Owing to the on/off valves 3.1 and 3.2 remaining in the open state, the same pressure level prevails in the inlet section 7 as in the first connecting section 6.1. For this reason virtually no further gas flows out of the inlet section 7 by way of the restrictor point 4.1 into the first connecting section 6.1. There is therefore practically no change in the total volumetric gas flow flowing through the gas valve unit when the permanent magnet 8 is moved further to the right in the drawing and as a result the on/off valve 3.1 is closed while the second on/off valve 3.2 is open.

By the permanent magnet 8 being moved to the right in the drawing the on/off valves 3.3. to 3.5 are opened in succession and the volumetric gas flow through the gas valve unit is thereby increased step by step.

Figure 3:
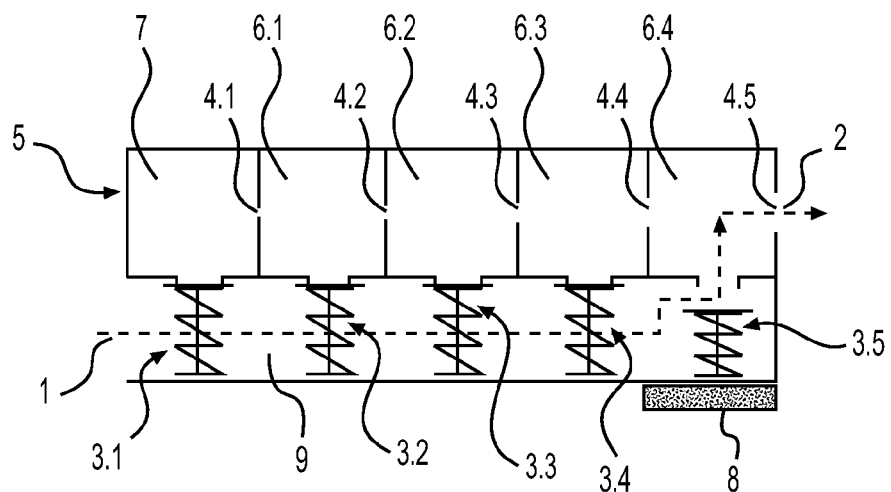
FIG. 3 shows the schematic switching arrangement with the last on/off valve open.

FIG. 3 shows the schematic switching arrangement of the gas valve unit in the maximum open position. In this case the permanent magnet 8 is located at its end position on the right-hand side in the drawing. In this position of the permanent magnet 8 the last on/off valve 3.5 is open. In this case gas flows directly from the gas inlet chamber 9 into the last connecting section 6.4 and passes only the last restrictor point 4.5 on the way to the gas outlet 2. Said last restrictor point 4.5 can have a through-flow cross-section which is so great that practically no restriction of the gas flow occurs and the gas can flow practically without restriction through the gas valve unit.

Figure 4:
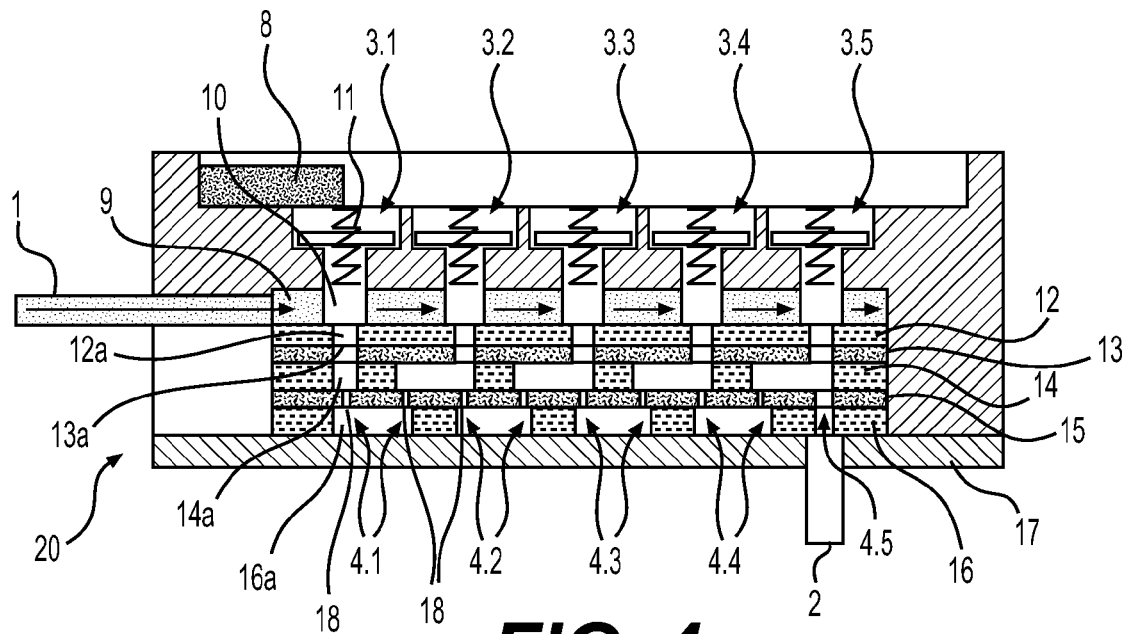
FIG. 4 shows a schematic structure not according to the invention of a gas valve arrangement with on/off valves closed.

FIG. 4 shows a schematic structure not according to the invention of a gas valve unit having a switching arrangement according to FIGS. 1 to 3. A valve chamber 20 can be seen in which the gas inlet 1 of the gas valve unit is embodied. Located in the interior of the valve chamber 20 is a gas inlet chamber 9 connected to the gas inlet 1. Shut-off bodies 10 of the on/off valves 3 are guided in the valve chamber 20 in such a way that they can move upward and downward as shown in the drawing. Each shut-off body 10 is pretensioned downward as shown in the drawing by means of a spring 11. Each shut-off body 10 can be moved upward as shown in the drawing against the force of the spring 11 by means of the force of the permanent magnet 8. The springs 11 press the shut-off bodies onto a valve sealing plate 12 so that the shut-off bodies 10 seal the openings 12a present in the valve sealing plate 12 in a gas-tight manner. Arranged below the valve sealing plate 12 is a pressure plate 13 having openings 13a corresponding to the openings 12a in the valve sealing plate 12. The openings 13a in the pressure plate 13 lead into openings 14a in a first gas distribution plate 14. According to the drawing, a restrictor plate 15 having a plurality of restrictor openings 18 is located below the first gas distribution plate 14. In this arrangement each of the restrictor points 4.1 to 4.4 is formed by two restrictor openings 18. The two restrictor openings 18 belonging to one restrictor point 4.1 to 4.4 are in each case connected to each other by means of the openings 16a in a second gas distribution plate 16. The openings 14a in the first gas distribution plate, on the other hand, connect the adjacently located restrictor openings 18 of two adjacent restrictor points 4.1 to 4.5. The last restrictor point 4.5 consists of just one restrictor opening 18 which leads by way of a corresponding opening 16a in the second gas distribution plate 16 into the gas outlet 2 of the gas valve unit.

In the switching position according to FIG. 4 the permanent magnet 8 is located at an end position in which all of the on/off valves 3 are closed. The gas valve unit as a whole is therefore closed. The volumetric gas flow is equal to zero. Starting from said switching position, the permanent magnet 8 is moved to the right as shown in the drawing, as a result of which the on/off valves 3 arranged in each case beneath the permanent magnet 8 are opened.

In the arrangement according to FIG. 4 the permanent magnet 8 which can be moved by the operator of the gas valve unit is located on the upper side of the gas valve unit. The restrictor plate 15 is accessible from below following removal of a closing plate 17. When the gas valve unit is installed in a gas cooking zone this requires that the underside of the gas cooking zone must be accessible and the gas cooking zone must have access openings on its underside.

Figure 5:
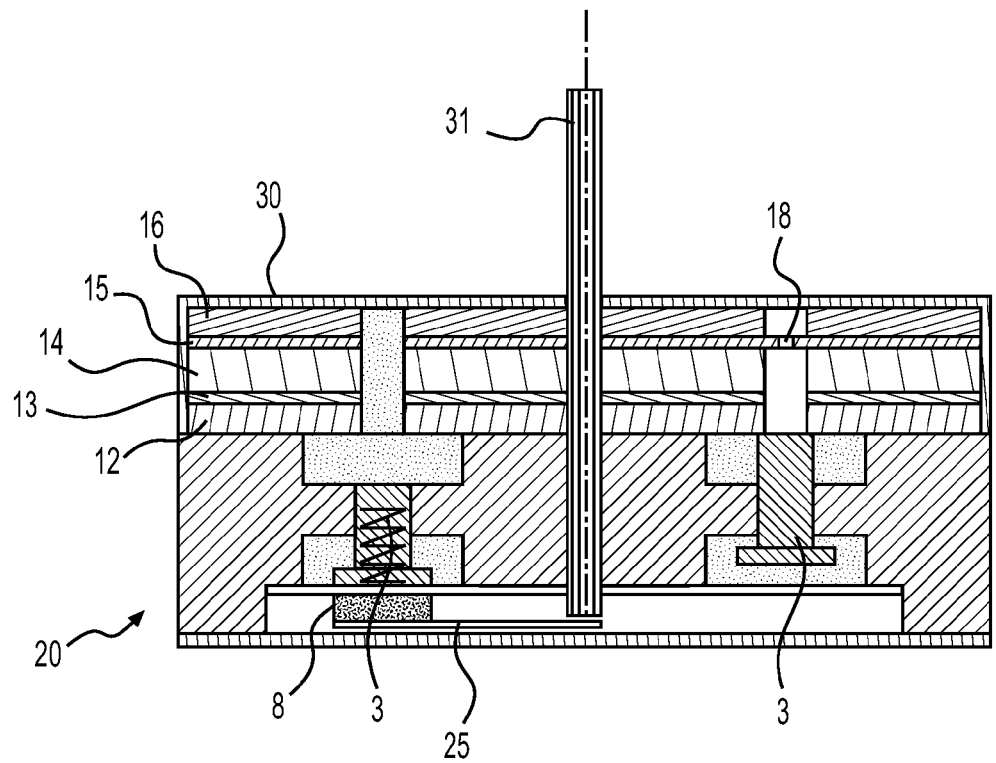
FIG. 5 shows the schematic structure of the gas valve unit according to the invention.

FIG. 5 shows the schematic structure of the gas valve arrangement according to the invention. The essentially rotationally symmetrical valve chamber 20 having a centrally arranged actuation shaft 31 can be seen. The for example five on/off valves 3 are arranged along an arc around the actuation shaft 31. Affixed non-rotatably on the actuation shaft 31 is a carrier 25 on the outer end of which is arranged the permanent magnet 8. When the actuation shaft 31 rotates, the permanent magnet 8 moves along an arc past the on/off valves 3. In each case the on/off valves 3 which are located directly above the permanent magnet 8 are opened by the magnetic force of the permanent magnet 8. A rotary knob which can be directly gripped by the operator can for example be attached at the top onto the actuation shaft 31. Alternatively, a for example electromotive final control element can also be coupled to the actuation shaft 31.

On the upper side of the valve chamber is constructed a covering 30 in which are arranged, from bottom to top, the valve sealing plate 12, the pressure plate 13, the first gas distribution plate 14, the restrictor plate 15 and the second gas distribution plate 16. The plates 12 to 16 are accessible by removing the covering 30. According to the invention, access to the plates 12 to 16 is from above, in other words from the same side from which the actuation shaft 31 protrudes out of the valve chamber 20.

In order to adapt the gas valve unit to a different gas type, in particular the restrictor plate 15 must be replaced. In the restrictor plate 15 are located the restrictor openings 18 which significantly determine the magnitude of the volumetric gas flow. When the covering is removed upwards, all the plates 12 to 16 are located in the covering 30.

Figure 6:
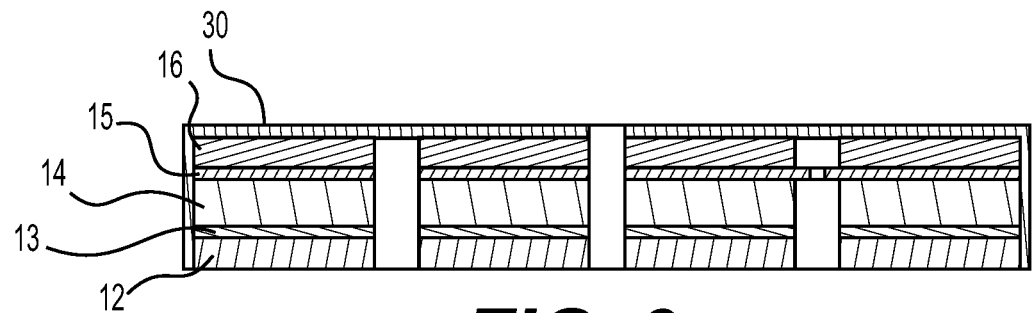
FIG. 6 shows a covering of the gas valve unit with plates arranged therein.

Said unit comprising covering 30 and plates 12 to 16 is illustrated in FIG. 6. The plates 12 to 15 can then be removed from the covering 30.

Figure 7:
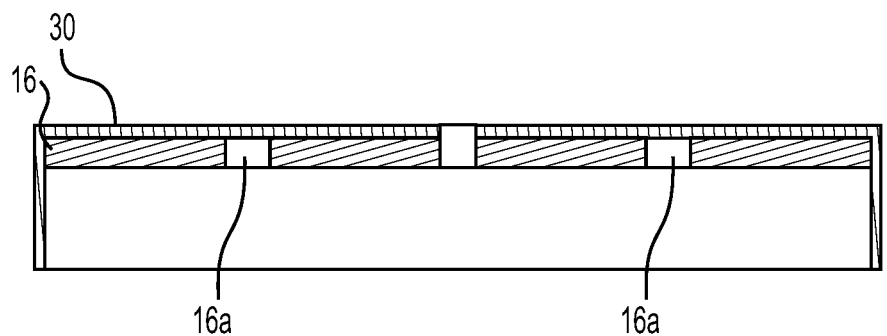
FIG. 7 shows a structural unit consisting of covering and second gas distribution plate.

FIG. 7 shows the upper gas distribution plate 16 integrated into the covering 30, forming a separable structural unit with the covering 30.

Figure 8:
FIG. 8 shows a restrictor plate.

FIG. 8 shows the restrictor plate 15 which can be replaced in isolation and individually.

Figure 9:
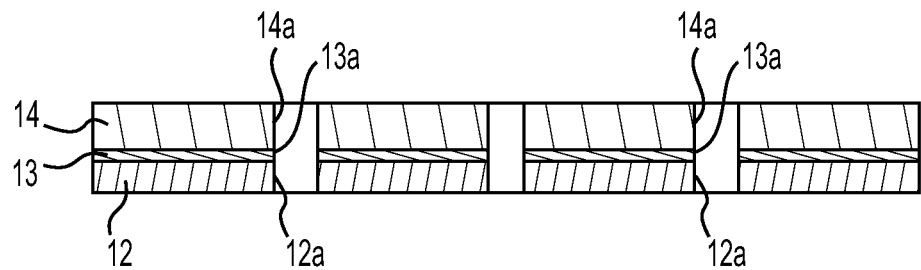
FIG. 9 shows a structural unit consisting of sealing plate, pressure plate and first gas distribution plate.

FIG. 9 shows a unit consisting of valve sealing plate 12, pressure plate 13 and first gas distribution plate 14, which are connected together to form a composite plate. Correct insertion of said plates 12 to 14 is facilitated by this means.

Figure 10:
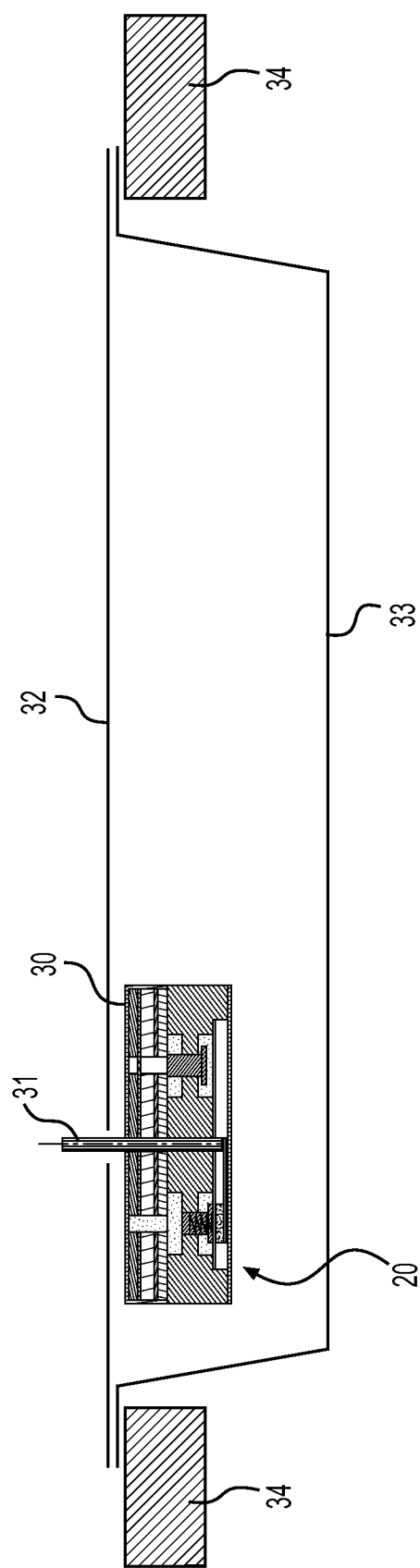
FIG. 10 shows a gas hob with a gas valve unit according to the invention.

FIG. 10 shows the schematic structure of a gas hob with a gas valve unit according to the invention. The gas hob has a hob housing 33 which is incorporated into a cutout section of a worktop 34 of a kitchen. The hob housing 33 is closed upwards by a cover plate 32. The cover plate can for example be made from stainless steel, ceramic glass or hard glass. The gas valve unit according to the invention is located in the interior of the gas hob. The actuation shaft 31 of the gas valve unit protrudes upwards through an opening in the cover plate 32.

The cover plate 32 of the gas hob is removed upwards in order to replace the restrictor plate 15. The covering 30 of the valve chamber 20 can subsequently likewise be removed upwards.

The arrangement according to the invention allows the hob housing to be embodied in completely closed fashion downwards. The gas lines connected to the gas valve unit which are not illustrated do not need to be disassembled in order to replace the restrictor plate 15.

The invention claimed is:

1. A gas valve unit for adjusting a volumetric gas flow which is fed to a gas burner of a gas device, said gas valve unit comprising:
   a valve chamber;
   an actuation shaft protruding out of the valve chamber;
   at least two on/off valves arranged in the valve chamber; and
   at least one restrictor plate arranged in the valve chamber and having at least two restrictor points, each of the restrictor points having at least one restrictor opening, said restrictor plate being accessible from a side of the valve chamber on which the actuation shaft is protruding from the valve chamber,
   wherein the valve chamber has a plurality of plates arranged parallel to one another, one of the plates being formed by the restrictor plate, and
   one of the plates is formed by a valve sealing plate which forms valve seats of the on/off valves.

2. The gas valve unit of claim 1, wherein the gas device is a gas cooking device.

3. The gas valve unit of claim 1, wherein the restrictor plate is replaceable.

4. The gas valve unit of claim 1, further comprising a covering removably arranged on the side of the valve chamber on which the actuation shaft protrudes from the valve chamber, said restrictor plate being accessible by removing the covering.

5. The gas valve unit of claim 1, wherein the valve sealing plate is made from a flexible material.

6. The gas valve unit of claim 5, wherein the flexible material is plastic.

7. The gas valve unit of claim 1, wherein the valve sealing plate has an opening in a region of a valve seat of each on/off valve, said opening being closed, when the on/off valve is closed and a shut-off body of the on/off valve sits on the valve sealing plate.

8. The gas valve unit of claim 1, further comprising a permanent magnet for actuation of the on/off valves.

9. The gas valve unit of claim 8, wherein the permanent magnet is configured to impose a force for movement of shut-off bodies of the on/off valves.

10. The gas valve unit of claim 1, further comprising a pressure plate made from substantially rigid material and arranged on a side of the valve sealing plate facing away from shut-off bodies of the on/off valves.

11. The gas valve unit of claim 10, wherein the pressure plate is made of metal.

12. The gas valve unit of claim 10, wherein the valve sealing plate has an opening in a region of a valve seat of each on/off valve, said pressure plate having openings corresponding to the openings in the valve sealing plate.

13. The gas valve unit of claim 12, further comprising a first gas distribution plate arranged between the pressure plate and the restrictor plate, said first gas distribution plate having openings corresponding to the openings in the pressure plate and to the restrictor openings in the restrictor plate.

14. The gas valve unit of claim 13, further comprising a second gas distribution plate arranged on a side of the restrictor plate facing away from the first gas distribution plate, said second gas distribution plate having openings corresponding to the restrictor openings in the restrictor plate.

15. The gas valve unit of claim 14, further comprising a covering arranged on the side of the valve chamber on which the actuation shaft protrudes from the valve chamber, said second gas distribution plate and said covering forming a structural unit.

16. The gas valve unit of claim 15, wherein the second gas distribution plate and the covering form a separable structural unit.

17. The gas valve unit of claim 12, wherein the valve sealing plate and the pressure plate and the first gas distribution plate form a non-separable structural unit.

18. A gas valve unit for adjusting a volumetric gas flow which is fed to a gas burner of a gas device, said gas valve unit comprising:
   a valve chamber;
   an actuation shaft protruding out of the valve chamber;
   at least two on/off valves arranged in the valve chamber;
   at least one restrictor plate arranged in the valve chamber and having at least two restrictor points, each of the restrictor points having at least one restrictor opening, said restrictor plate being accessible from a side of the valve chamber on which the actuation shaft is protruding from the valve chamber; and
   a permanent magnet for actuation of the on/off valves,
   wherein the valve chamber has a plurality of plates arranged parallel to one another, said permanent magnet being arranged on a side of the on/off valves facing away from the plates.

19. The gas valve unit of claim 18, further comprising a covering removably arranged on the side of the valve chamber on which the actuation shaft protrudes from the valve chamber, said restrictor plate being accessible by removing the covering.

20. A gas valve unit for adjusting a volumetric gas flow which is fed to a gas burner of a gas device, said gas valve unit comprising:
   a valve chamber;
   an actuation shaft protruding out of the valve chamber;
   at least two on/off valves arranged in the valve chamber;
   at least one restrictor plate arranged in the valve chamber and having at least two restrictor points, each of the restrictor points having at least one restrictor opening, said restrictor plate being accessible from a side of the valve chamber on which the actuation shaft is protruding from the valve chamber; and
   a permanent magnet for actuation of the on/off valves,
   wherein the permanent magnet is spaced away from the actuation shaft in a radial direction and is coupled to the actuation shaft in such a manner that a rotation of the actuation shaft causes a movement of the permanent magnet relative to the on/off valves.

21. The gas valve unit of claim 20, further comprising a covering removably arranged on the side of the valve chamber on which the actuation shaft protrudes from the valve chamber, said restrictor plate being accessible by removing the covering.

* * * * *